(12) United States Patent
Chychi et al.

(10) Patent No.: US 11,968,226 B1
(45) Date of Patent: Apr. 23, 2024

(54) TARGETED TRAFFIC FILTERING

(71) Applicant: Amazon Technologies, Inc., Reno, NV (US)

(72) Inventors: Payam Tarverdyan Chychi, Bothell, WA (US); Dennis Marinus, Seattle, WA (US); Shawn Joseph Marck, Seattle, WA (US); Stephen Roderick O'Dor, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 224 days.

(21) Appl. No.: 15/461,051

(22) Filed: Mar. 16, 2017

(51) Int. Cl.
*H04L 9/40* (2022.01)
*H04L 43/0888* (2022.01)
*H04L 45/00* (2022.01)
*H04L 47/127* (2022.01)
*H04L 61/5007* (2022.01)

(52) U.S. Cl.
CPC ...... *H04L 63/1441* (2013.01); *H04L 43/0888* (2013.01); *H04L 45/22* (2013.01); *H04L 47/127* (2013.01); *H04L 61/5007* (2022.05); *H04L 63/0236* (2013.01); *H04L 63/1416* (2013.01); *H04L 2463/141* (2013.01)

(58) Field of Classification Search
CPC . H04L 63/14; H04L 63/1408; H04L 63/1416; H04L 63/1425; H04L 63/1441; H04L 63/1458; H04L 47/12; H04L 47/127; H04L 47/20; H04L 47/32; H04L 2463/141; H04L 2463/142; H04L 2463/144
See application file for complete search history.

(56) References Cited

U.S. PATENT DOCUMENTS

| | | | | |
|---|---|---|---|---|
| 5,032,833 A | * | 7/1991 | Laporte | H02J 13/0086 370/351 |
| 6,304,913 B1 | * | 10/2001 | Rune | H04L 29/12066 709/241 |
| 7,260,602 B2 | * | 8/2007 | Osborne | G06F 8/60 370/238 |
| 7,353,291 B1 | * | 4/2008 | Ogino | H04L 67/1008 709/203 |
| 7,444,417 B2 | * | 10/2008 | Jayawardena | H04L 29/06 370/401 |
| 7,568,232 B2 | * | 7/2009 | Mitomo | H04L 63/10 726/22 |

(Continued)

*Primary Examiner* — Zachary A. Davis
(74) *Attorney, Agent, or Firm* — Hogan Lovells US LLP (57) ABSTRACT

Remote Triggered Black Holes (RTBHs) can be precisely placed on networks that are not directly physically connected to a target of an attack. A network source of a potential attack can be determined. A path between the network source and the target can be identified, and a determination can be made as to which networks along that path subscribe to an attack mitigation service. From multiple identified subscriber networks, a subscriber network can be identified that is determined to be appropriate for placement of a black hole to mitigate the attack. Once selected, the identified network can receive attack information and acknowledge placement of the black hole. The subscriber network can then begin discarding traffic for the attack target. A subscriber-owned list of network prefixes can be reviewed before allowing RTBH injection for a corresponding address space.

20 Claims, 7 Drawing Sheets

(56) References Cited

U.S. PATENT DOCUMENTS

| | | | | |
|---|---|---|---|---|
| 7,746,789 | B2 * | 6/2010 | Katoh | H04L 41/5054 |
| | | | | 370/238 |
| 7,756,032 | B2 * | 7/2010 | Feick | H04L 43/08 |
| | | | | 370/234 |
| 7,853,983 | B2 * | 12/2010 | Abrutyn | H04L 67/18 |
| | | | | 726/2 |
| 8,358,662 | B2 * | 1/2013 | Bernstein | H04L 45/04 |
| | | | | 370/410 |
| 8,613,089 | B1 * | 12/2013 | Holloway | H04L 63/1458 |
| | | | | 726/23 |
| 9,306,969 | B2 * | 4/2016 | Dagon | H04L 29/12066 |
| 9,398,035 | B2 * | 7/2016 | Vasseur | H04W 12/1205 |
| 9,424,429 | B1 * | 8/2016 | Roth | G06F 21/45 |
| 9,560,078 | B2 * | 1/2017 | Sood | H04L 63/20 |
| 9,609,018 | B2 * | 3/2017 | Smith | H04L 63/02 |
| 9,742,795 | B1 * | 8/2017 | Radlein | H04L 63/1441 |
| 10,567,246 | B2 * | 2/2020 | Randolph | H04L 43/16 |
| 10,630,719 | B2 * | 4/2020 | Jiang | H04L 43/16 |
| 10,797,965 | B2 * | 10/2020 | Nieves | H04L 63/0876 |
| 11,106,948 | B2 * | 8/2021 | Vichare | H04Q 9/00 |
| 11,394,743 | B2 * | 7/2022 | Jiang | H04L 9/40 |
| 2002/0131369 | A1 * | 9/2002 | Hasegawa | H04L 43/10 |
| | | | | 370/241 |
| 2008/0228920 | A1 * | 9/2008 | Souders | H04L 67/2842 |
| | | | | 709/226 |
| 2009/0089452 | A1 * | 4/2009 | Miwa | H04L 41/044 |
| | | | | 709/241 |
| 2015/0058976 | A1 * | 2/2015 | Carney | H04L 63/1458 |
| | | | | 726/22 |
| 2017/0070531 | A1 * | 3/2017 | Huston, III | H04L 63/1458 |
| 2017/0272465 | A1 * | 9/2017 | Steele | H04L 63/101 |
| 2018/0013787 | A1 * | 1/2018 | Jiang | H04L 29/06 |
| 2018/0020016 | A1 * | 1/2018 | Hu | H04L 43/028 |
| 2019/0297017 | A1 * | 9/2019 | Pignataro | H04L 47/11 |

* cited by examiner

-- Prior Art --

TARGETED TRAFFIC FILTERING

BACKGROUND

Users are increasingly performing tasks using electronic computing resources available over one or more data networks. Users can submit and receive communications using network connections provided by various network service providers. Unfortunately, these types of communications can also be used to launch attacks on various entities, such as content providers. A malicious party can launch a distributed denial of service (DDoS) attack, for example, by overwhelming a content provider with more network traffic than the provider can manage without an impact on service. While the provider can contact a directly connected network provider to drop any traffic associated with a particular address of the attack, this approach results in all legitimate traffic for that address being lost as well.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of communications in a network environment. In particular, various embodiments provide for the specific and/or precise placement of black holes, and other mitigations, across a set of networks whether or not the networks are directly physically connected to the target of the attack. If a potential attack is detected on a target, such as an Internet Protocol (IP) address, a network source (or sources) of the attack can be determined. A path between the network source or sources of the attack and the IP address of the target can be identified, and a determination can be made as to which networks along that path subscribe to a traffic management or other such attack mitigation service. From the identified subscriber networks, a subscriber network can be identified that is determined to be optimal and/or appropriate, for placement of a black hole along the path to mitigate the attack. The network can be determined to be optimal and/or appropriate, based upon various factors, which may include the logical distance from the attack target or a state of the network, etc. Once selected, a notification can be sent that includes information about the attack and the identified network. The identified network can acknowledge placement of the black hole, and can begin discarding traffic for the attack target. The black hole can be implemented for a period of time, after which the black hole can expire. In situations where there are multiple attack paths, there can be multiple black holes implemented, and the placement and/or number of the black holes can change if the attack changes or continues.

Various other such functions can be used as well within the scope of the various embodiments as would be apparent to one of ordinary skill in the art in light of the teachings and suggestions contained herein.

Figure 1:
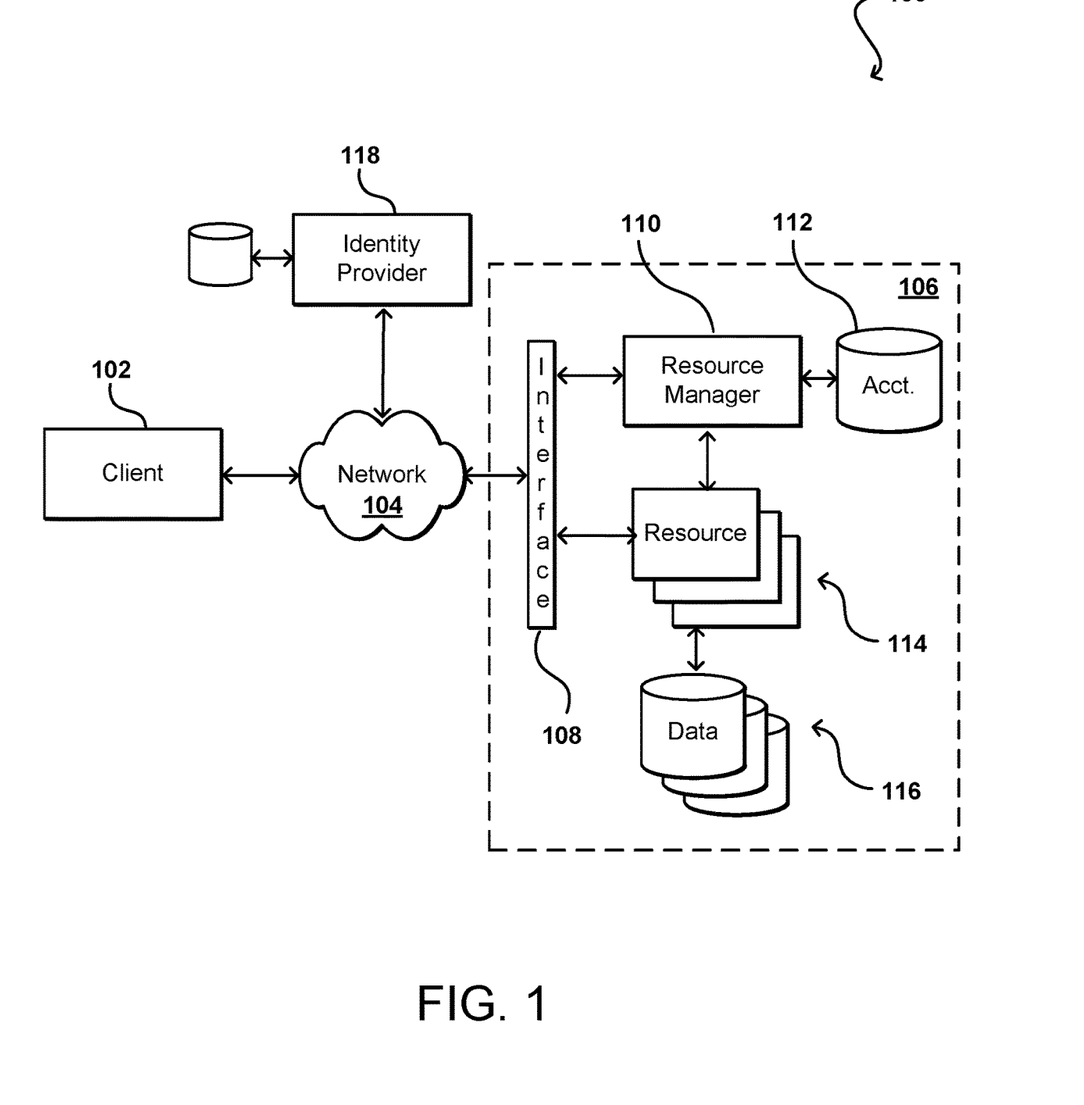
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received by an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received by the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a Security Assertion Markup Language (SAML) provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys and/or certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request by one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2A:
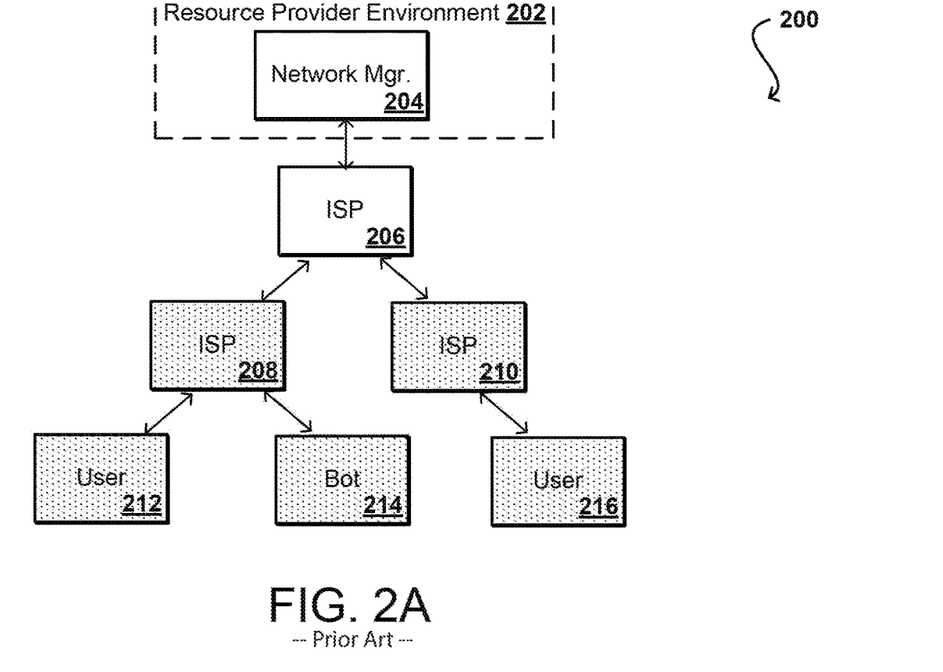
FIGS. 2A and 2B illustrate network mappings and the impact of black hole placement on traffic that can be implemented in accordance with various embodiments.

As mentioned, the resources and services provided through such an environment can receive requests and other network traffic from a wide variety of different sources, which can follow various network paths through various network providers. FIG. 2A illustrates an example network arrangement 200 wherein different user devices 212, 216 can communicate with the resources of a resource provider environment 202 via different network paths. In this example, each user device 212, 216 connects to a network, such as the Internet, through a different network service provider, which may include various Internet service providers (ISPs) 208, 210. These ISPs can be the companies with which the users have accounts to obtain network access. In order to communicate with the resource provider environment 202, each of these ISPs may have to direct network traffic (directly or indirectly) through yet another service provider 206, who in this example has a direct connection and relationship with the resource provider environment 202. A network manager 204 or other such service maintained by the resource provider environment 202 can communicate directly with the service provider 206 to request various actions as may relate to network traffic directed to, and from, the resource provider environment 202.

As mentioned, there can be situations where a malicious entity, such as an automated bot 214 in this example, may attempt an attack or other malicious activity with respect to the resource provider environment 202. The attack can take any of multiple possible forms, which may include a distributed denial of service (DDoS) or other volumetric attack. A DDoS attack typically involves a plurality of compromised or malicious devices that direct a heavy volume of traffic towards a target of the attack. The volume of network traffic can cause issues for the resource provider environment, and in some instances can even result in an unavailability of the resources of the environment. Because the attack does not come from a single location, it is not sufficient to attempt to stop the attack by blocking traffic from a single address (e.g., Internet protocol (IP) address). Further, it can be difficult to determine which traffic is from legitimate users or sources and which traffic is associated with the attack. DDoS attacks typically involve multiple botnets 214 distributed across various locations.

In the simplified example of FIG. 2A, a botnet 214 is submitting malicious traffic through a first ISP 208 that passes through one or more components (network routers, etc.) of a second ISP 206 before arriving at the resource provider environment 202. One conventional approach to stopping a DDoS involves triggering what is referred to as a black hole for a specific destination address. Generally speaking, a black hole can refer to, for example, a change in network routing at a location such that the identified traffic is routed to nowhere, or an invalid address, such that the traffic is effectively discarded or otherwise not routed to its intended destination. A network manager 204 might determine an IP address to which the attack traffic is being directed, and can cause all traffic to that IP address to be dropped. So that the resource provider does not have to receive and process the malicious traffic, the network manager can instead contact one of the ISPs and provide the targeted IP address in order to request that the ISP not deliver any packets to that IP address, and in fact can drop any packets for that address until further notice.

Due to conventional limitations on network traffic, however, the ability for the resource provider to request such a black hole for network traffic is limited. In order to preserve the security of data such as network router information, network operators only allow such requests for providers with a direct relationship with the requesting entity, whether through an exchange, peering, or other such relationship. Further, without an existing relationship it would be difficult for operators to process such requests for various entities. Thus, in the example situation of FIG. 2A the network manager 204 could only ask that the directly connected service provider 206 block traffic destined for the target IP address. As can be seen, however, the traffic from any legitimate user wanting to send requests to that traffic would be blocked as well. While such an approach may thwart the attack, and thus benefit the resource provider and protect its infrastructure, such an approach comes at the expense of actual valid users 212, 216 who will also have their traffic to that address blocked. If this is a service such as an on-demand media service, then that service may effectively be taken offline for a period of time. This can impact not only the users, but also the content provider who generates revenue from the service. By blocking or dropping all traffic at the directly physically connected ISP 206, traffic will be dropped for all packets flowing through the ISP and thus all the shaded blocks in the figure will be prevented from submitting messages to the target IP address. Such an approach also will not benefit the other ISPs 208, 210 who will still have to process the attack traffic.

Accordingly, approaches in accordance with various embodiments attempt to lower DDoS mitigation costs while increasing mitigation capabilities. These approaches can also attempt to focus the mitigation such that the amount of valid traffic impacted by the mitigation is minimized. A more granular view can be obtained with respect to the source of the attack, and any mitigation can be initiated as closely as possible to the source such that a minimal amount of legitimate traffic is affected. The approaches can determine at least a portion of a network path (or set of paths) along which the attack traffic is traveling, and can determine an appropriate location along the path(s) to request the placing of a black hole or other mitigation. Only traffic that would otherwise pass through the location of the black hole will be dropped and unable to be delivered to the target destination.

Figure 2B:
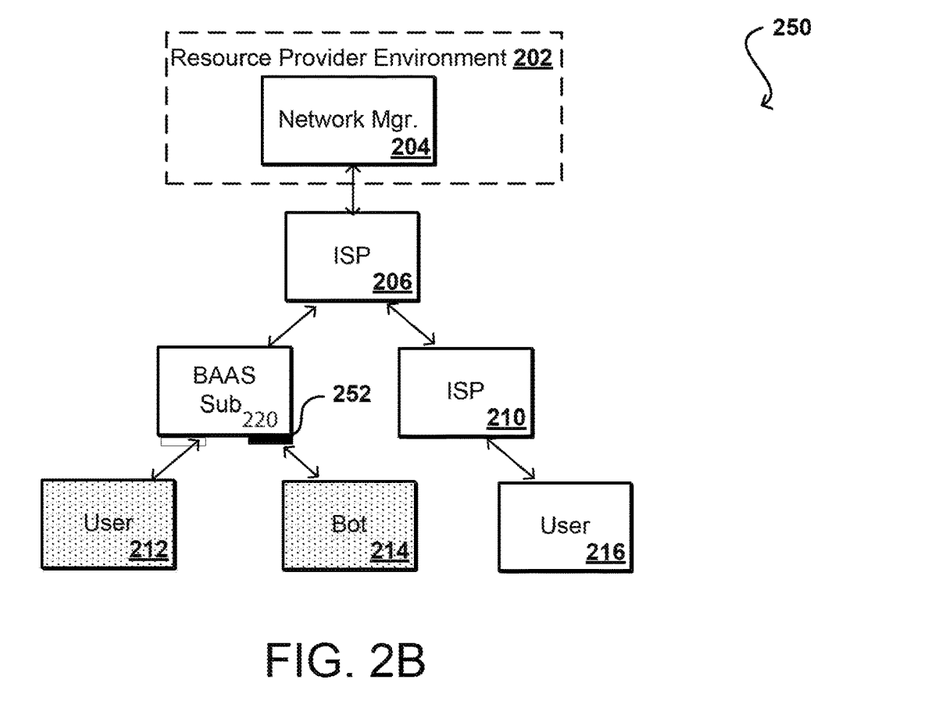

For example, the configuration 250 of FIG. 2B indicates that in addition to the directly physically connected service provider 206, a second service provider 220 has a relationship with the service provider environment. In this example, the second provider 220 is a subscriber to what is referred to herein as a "black hole as a service" (BAAS) service provided by the service provider environment, wherein the second provider 220 is able to share information with the network manager 204 and determine appropriate actions to take with respect to various network traffic. The second provider, as referred to as a BAAS subscriber 220, can share information with the network manager to determine that the attack traffic is passing not only through the connected service provider 206 but also through the BAAS subscriber 220 routing infrastructure. The BAAS service, which can be managed and/or provided by the network manager 204, or other devices internal or external to the service provider environment, can also determine that there are no other BAAS subscribers further along the path where a black hole might be preferably placed. Accordingly, the BAAS service can request that the identified BAAS subscriber 220 place a black hole 252 in its routing infrastructure. In at least some embodiments, all traffic traversing the identified BAAS subscriber 220 will be impacted in one embodiment. Additionally, the attack route exchange information can contain information for the identified source of the attack (i.e., the offending network) and this information can be utilized such that traffic passing through the infrastructure from the path of the attack and destined for the identified IP address, or other destination, is dropped or otherwise prevented from passing further along the path towards its destination, depending at least in part upon the capabilities of the identified BAAS subscriber. As illustrated in FIG. 2B, the amount of impacted traffic can be significantly reduced, the extent of which can depend upon the type of black hole or filtering implemented. For example, if the subscriber 220 drops all traffic for the identified IP address of the destination then traffic from only one of the legitimate users 212 will be affected, while traffic through the other ISP 210 will not. If the black hole further identifies traffic based on source, then only the bot 214 sending the attack traffic would be affected, as well as any other sources along that branch of the path. The other legitimate users 212, 216 would not be impacted by the black hole, other than potentially seeing an improvement in performance due to the reduction in traffic being received by the resource provider environment 202. Such an approach not only provides improved attack management for the resource provider, but also for customers hosting services using resources in the resource provider environment. A customer utilizing a service such as BAAS can much more selectively deal with attacks against the hosted resources while keeping the service available to most users, even under large-scale attacks. Instead of protecting the provider at the expense of the users, this approach attempts to minimize the impact on legitimate users of the service.

In at least some embodiments, information about attack routes that are injected into the service can be exposed not only to directly physically connected peer providers, or networks, but also to other providers across the relevant network(s). A network provider or operator will be able to subscribe to the BAAS service to receive updates or notifications from the service, or to be able to access lists of pending attack routes, among other such options. In some embodiments notifications about an attack route will only be pushed or published to those subscribers determined to be impacted by the route, while in other embodiments the notifications can go out to any or all subscribers. There can be various criteria that providers might be able to specify to determine which notifications they should receive, which may relate to a type of attack, size of an attack, amount of traffic impacting them, and the like. This can enable a provider to balance the overhead of managing black holes with the performance degradation resulting from not implementing the black holes and processing the attack traffic. Further, a subscriber can ingest the attack data and choose to utilize that data in a number of different ways inside their respective infrastructure. While a common approach may be to take the less complicated approach and drop the traffic corresponding to the attack route, other approaches can be utilized as well, such as to process the data and attempt to determine legitimate traffic that can be released, subsequently delivered, or otherwise processed. In some embodiments, notifications can be sent back to the senders of the traffic to notify them of the temporary delivery issues.

As part of the traffic management approach, a service provider might logically treat various other network providers as peers. An example of a peer-based network is provided in the implementation 300 of FIG. 3. In many instances, the infrastructure for at least some of these peers can be significantly smaller than the infrastructure of the resource provider environment 302. When an attack is launched on the resource provider environment 302 that passes through one of these peers, the peer infrastructure can become congested and/or saturated, which can potentially lead to failure or availability issues for the peer. Approaches in accordance with various embodiments can enable these peers to minimize the impact of the attack by consuming the incoming data and then dropping the identified attack data. The attack data can be identified by receiving the destination information, such as the target IP address, that has been identified by the resource provider environment 302 (or another appropriate system or service) as being associated with a determined attack, or at least an unusual amount of stress on the network. The IP address can be distributed to any or all peers subscribed to the service, as may be determined by attributes set for the information, the configuration of the various peers, or other such information. In some embodiments, peer subscribers can also potentially share the attack information with other peer subscribers as well. Such approaches also do not require specific hardware configurations or direct physical connectivity in order to filter attack traffic. These approaches also do not require a network to build and manage additional relationships, or to adjust internal policies to enable such functionality. Various types of network providers or other entities or users across any appropriate network can utilize and/or leverage such functionality. In at least some embodiments, each peer network also has the potential to inject, for their respective IP resources, information about determined attack traffic. The attack information can be broadcast to all peers or peers determined to be along an attack path, among other such options.

Some embodiments may require subscribers to filter any attack traffic detected across a network, or to at least perform some level of processing of the traffic. In other embodiments subscribers can make their own determinations as to whether to process identified attack traffic, as well as how to process any such traffic. Subscribers may be under no obligation to perform any remediation or take any action in at least some embodiments, but in some embodiments their subscription may be impacted or revoked if it is determined that the subscriber is not operating in good faith, honoring its commitments, and/or contributing to BAAS by not responding to the identified subscriber attack route injections. In some embodiments, certain types of subscribers might be "notification only" subscribers while others are expected to take action, among other such options. For example, in some embodiments a subscriber might decide to tag traffic as attack traffic but let that traffic through, in order to prevent inadvertently filtering out any legitimate traffic while enabling entities downstream to better identify potentially malicious traffic.

As mentioned, various types of information can be included in the messages or notifications to subscribers. In one embodiment, information such as border gateway protocol (BGP) information can be utilized for route information exchange. BGP is a gateway protocol used to exchange information such as routing and availability information, and can be used to make routing decisions based on information such as available paths, routing rules, and network policies, among other such options. Some subscribers will utilize BGP-capable routers that can utilize this information. For other subscribers, an application programming interface (API) or other such interface or mechanism can be provided which would enable those subscribers to obtain and digest the information using, for example, a static file with identifying information for various attack traffic. Other mechanisms for obtaining the information can also be made accessible via such an API.

Figure 3:
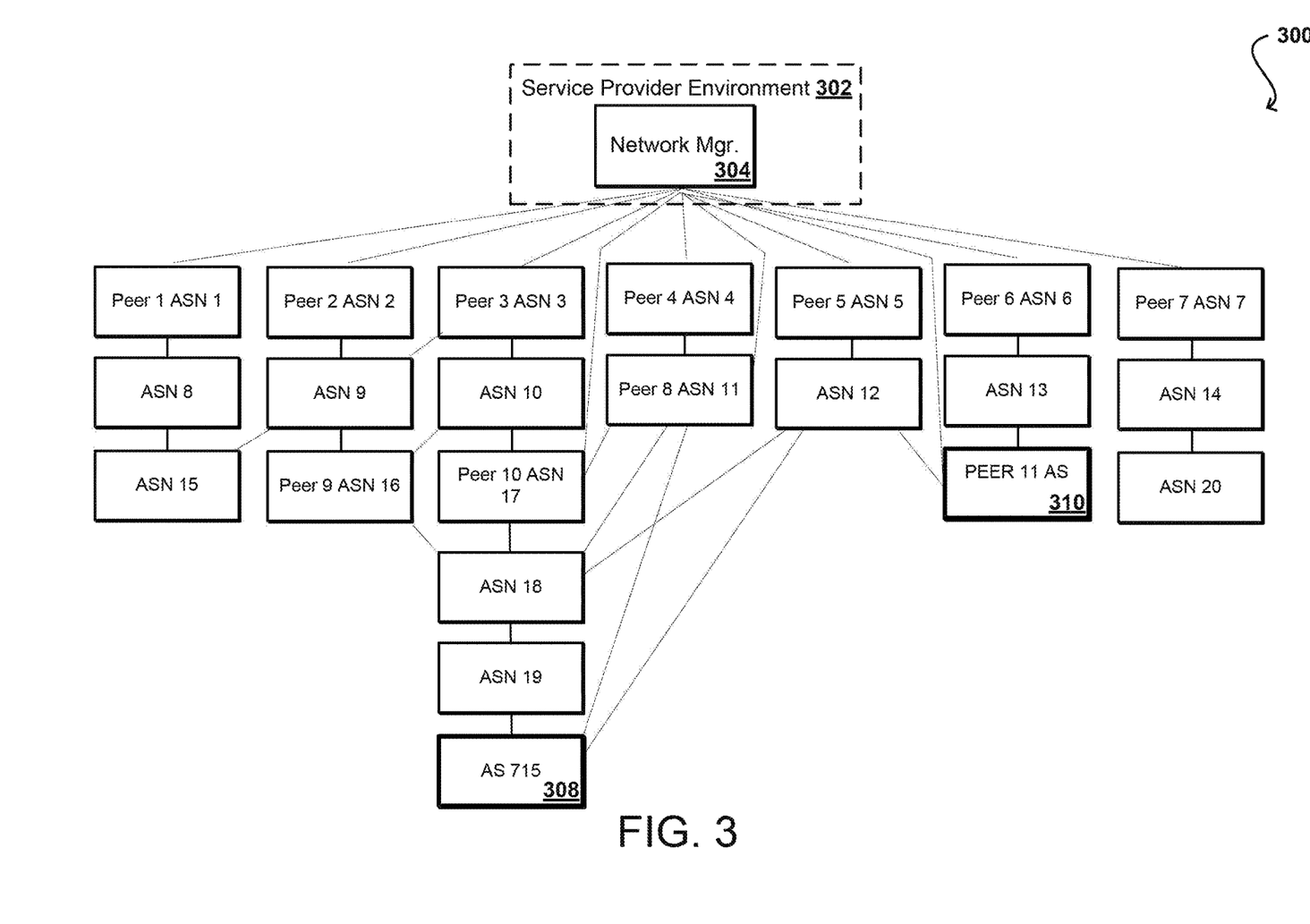
FIG. 3 illustrates an example attack source determination that can be generated in accordance with various embodiments.

For an example BGP-based approach, each individual network can be assigned a unique identifier. In FIG. 3, these numbers are identified as Autonomous System Number (ASN) values. For example, Peer 1 is assigned as ASN 1, and networks that do not have peers can still be assigned ASN values, such as for ASN 15. These ASNs can be unique identifiers that can be used to identify specific locations along a path where specific traffic should be dropped or otherwise handled in a specific manner. This can enable attack traffic at a specific location to be filtered, while traffic for the target IP address is allowed for other traffic flowing through other paths or networks in the hierarchy. In some embodiments the identified network can then transmit an acknowledgement to the sender, or to all subscribers, to indicate whether the identified traffic will be discarded or otherwise processed. This enables the network manager 304 to adjust to a different network along the path if the targeted network does not acknowledge or otherwise is unable or unwilling to perform the requested or desired mediation. In FIG. 3, it can be desirable to place the mediation at a network as low in the layout of the figure as possible in order to minimize the impact to legitimate traffic for a target IP address, but if that network cannot be utilized then a higher network in the layout can be targeted. In some embodiments multiple networks may need to be identified based on the scope or paths of the attack. In still other embodiments or instances an attack might be of such magnitude that all networks are identified, or a message sent with a specific tag or global identifier, such that each subscribing network can determine whether to drop or otherwise handle the suspicious traffic.

The example of FIG. 3 is illustrated from the perspective of the service provider. A network manager 304 or other system or service of the resource provider environment 302 can detect a potential DDoS attack, or other such attack or occurrence. In some embodiments a traffic monitor can detect the attack and notify the network manager with the appropriate information. The network manager can determine the IP address corresponding to the attack in this example, and can attempt to determine the network path(s) along which the attack traffic is being transmitted. The process can determine the potential peers along the path where a black hole may be placed to mitigate the attack. In this example, the network manager 304 can receive a list of the one or more peers where a black hole can or should be placed, and can generate the appropriate notification(s). In some embodiments, the network manager will receive a list of all potential networks and will determine the peer locations for a black hole, and can update the determination based at least in part upon the responses back from the peers. The network manager can also monitor the attack for updates in the IP address targeted, and can update the notifications accordingly. In at least some embodiments the network manager can determine the various networks along the paths independent of whether those networks are subscribers to the service. In the example, subscribers are identified by a peer number, such that Peer 1 ASN1 is a subscriber but ASN 20 is not. Further, the networks identified can be, but do not need to be, directly connected to the resource provider environment 302. Such an approach helps to determine the paths, as well as which paths contain one or more subscribers to the service.

In the example of FIG. 3 an attack has been identified for a specific IP address, and the attack has been traced back as far as a specific network 308 or attack source ("AS"), here labeled AS 715. Once identified the actual path that the attack traffic would take through the networks can be determined. In some embodiments the mitigation can look at all possible paths, such as may pass through peers 3, 4, 5, 8, 9, or 10, and attempt to place a black hole at any or all of these networks. In order to minimize the impact on legitimate traffic, however, the process can attempt to identify the actual path the traffic is likely to take, and attempt to select an appropriate subscriber along that path.

Figure 4:
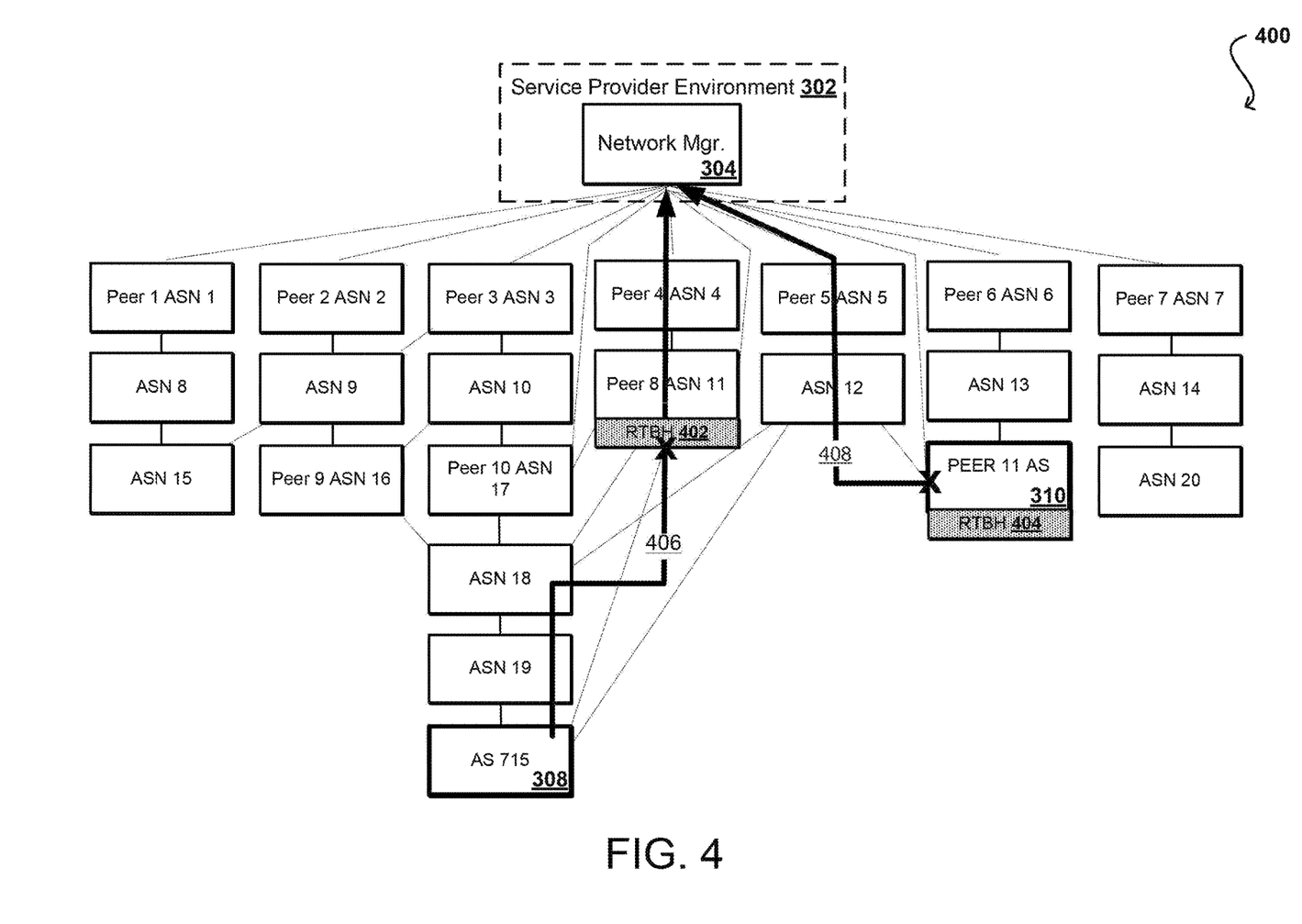
FIG. 4 illustrates an example attack path determination that can be generated in accordance with various embodiments.

The example network configuration 400 illustrated in FIG. 4 shows the determined path 406 that the attack traffic would take between the attack source 308 and the IP address of the service provider environment 302. The actual path may be the current BGP path out of all possible paths, among other such options. It should be understood that reference numbers for similar elements may be carried over between figures for simplicity of explanation, but such usage should not be interpreted as a limitation on the scope of the various embodiments unless otherwise specifically stated. The network manager 304 in this example can analyze the networks along the path and determine that there are two subscriber peers along the path, Peer 4 and Peer 8. While networks 18 and 19 are closer to the source along the path, those networks are not subscribers to the service. The network manager can then determine that Peer 8 is closer to the source 308 of the attack along the path than Peer 4, and as such can determine that a remotely triggered black hole (RTBH) 402 can advantageously be placed at Peer 8. As discussed, an RTBH can effectively change the network routing at a peer in order to cause specific traffic to be routed to "nowhere" or effectively discarded and not routed to its intended destination. In this way, none of the other traffic from different networks will be impacted, even if that traffic passes through Peer 4, which is along the path of the attack traffic.

The network manager 304 can generate a notification indicating the IP address for the traffic and the network number (ASN 11) of the network which should initiate the RTBH. The network manager can wait for an acknowledgement from the determined network, here Peer 8, to ensure that the traffic will be dropped by that network. If no acknowledgement is received within a determined period of time, or if the acknowledgement indicates that the traffic will not be dropped or otherwise managed, then the network manager 304 can send another notification to Peer 4 to drop the attack traffic for the identified IP address. As illustrated in FIG. 4 it is determined that another network 310 is also functions as a source of the attack traffic. It should be understood that Peer 11 may not in fact be the actual source of the attack, but may be the last determinable network or entity along the determined attack path 408. Since Peer 11 is a subscriber, the network manager 304 can request that another RTBH 404 be placed on that subscriber network 310 as well. The network manager 304 (or other service) can utilize network route information obtained through the peer networks or subscribers, such that the ASN network numbers can be mapped to specific networks along the various paths. The information in some embodiments can be used to build and maintain a global route table identifying one or more networks along each possible path of incoming traffic, which is possible because each path will have a directly physically connected network. As mentioned, the information can be obtained from the peers using BGP, if supported, or through various applications enabling the information to be submitted through an API or otherwise provided. The information can also be cross-referenced with router interface bandwidth patterns in order to accurately determine that the attack is in fact being received through a particular peer. Other information can be used to determine the appropriate peer network for a black hole as well. For example, it might be the case that Peer 8 is not overwhelmed with attack traffic, but Peer 4 is indicating that it is being overwhelmed. In such a situation, a determination might be made to instead place the RTBH at Peer 4. A service might not require, or even request, a black hole be implemented by a specific peer unless that peer is being impacted by the attack in at least a minimal or specific way. Due to the hierarchical nature of network best path selection, if the network manager 304 is indicating an inbound attack and has identified the source 308 of the attack, by analyzing best path it would determine Peer 8 to be the best place for RTBH regardless of a congestion event in at least some embodiments, as the network manager 304 may not be able to determine congestion events in Peer 8. If an RTBH on Peer 8 does not discard traffic, this could indicate that: the active path between the source and destination has changed, the path discovery process did not properly detect the source of the attack or was unable to properly detect the best place for RTBH, and there was an inability to successfully determine multiple source networks for the attack.

In at least some embodiments, subscriber networks may be unable to propagate RTBH globally within those networks based upon factors such as the regionalization of those networks. The footprint of an organization may span across multiple countries or continents. If the source 308 of the attack had networks in two different continents, then the source IP addresses for the attack could all appear to come from a single source 308, but there can be multiple valid network paths. To allow a BAAS service to accurately associate the source of an attack from multiple regions for the same network, the BAAS service can maintain an active list of regions per subscriber. In the event of a non-subscribing network 308 existing via multiple geographical locations, the service can determine the best place to trigger an RTBH by knowing that the RTBH is assigned to a specific region associated with the source network 308. Such an approach can be valid if subscribers do not have global null route capabilities such that the RTBH would not propagate out of the network.

It should be noted that the routes through various networks, such as the Internet, are not symmetrical, such that the path to a particular peer is not necessarily the path traffic would take from that peer. As such, the network manager 304 in some embodiments can determine all possible paths for the attack traffic and start placing selective black holes, or null routes, and determine where the traffic stops. Such an approach can be used to determine the peer with the highest probability of carrying traffic from an attack. Similar probabilities can be used to determine other peer locations for black holes or null routes as well. In some embodiments a minimum probability threshold can be used to determine which peer(s) should implement a black hole. If there are several peers with similar probabilities, then each of those peers might be requested to have a black hole placed thereon. In other embodiments the black holes can be placed one at a time until the attack is sufficiently mitigated, in order to minimize the impact on legitimate traffic. Thus, if it is determined that there are three viable options but based on the routing table and current information the attack will not dissipate if a black hole is placed on the most likely option then the black hole can instead be placed on the next best option, or black holes can be placed on both, among other such options. The attack traffic can continue to be monitored and black holes added or moved as appropriate to mitigate the attack. The traffic can also be monitored, such as by communicating with the peers executing the black holes, to determine when a black hole can be removed due to the attack traffic falling to acceptable levels. Thus, in some embodiments the network manager will utilize one or more heuristics to determine a "best" option, then monitor the impact and make adjustments as appropriate to mitigate the attack while minimizing the impact on legitimate traffic. In some embodiments the IP address associated with the attack can be determined and advertised to the subscribing peers. Information for the identified peer(s) and/or path(s) can be included as well in some embodiments to enable the peers to make intelligent decisions as to how to process the traffic. As mentioned, some services may require subscribers to take specific actions in response to a detected attack.

As mentioned, various attribute tags can be used to determine attack mitigations as well. A tag can be a unique number used to exchange information. Using a BGP approach, a tag such as 65001:14 could specify the unique number (65001) as well as the ASN (14) for a determined peer. Thus, publishing a value such as 65001:14 would indicate that the Peer with ASN 14 should discard any traffic matching tag value 65001, the IP address, etc. Various other types of tags and identifiers can be used as well within the scope of the various embodiments. Further, the types of notifications or publications used can vary as well between embodiments.

Figure 5:
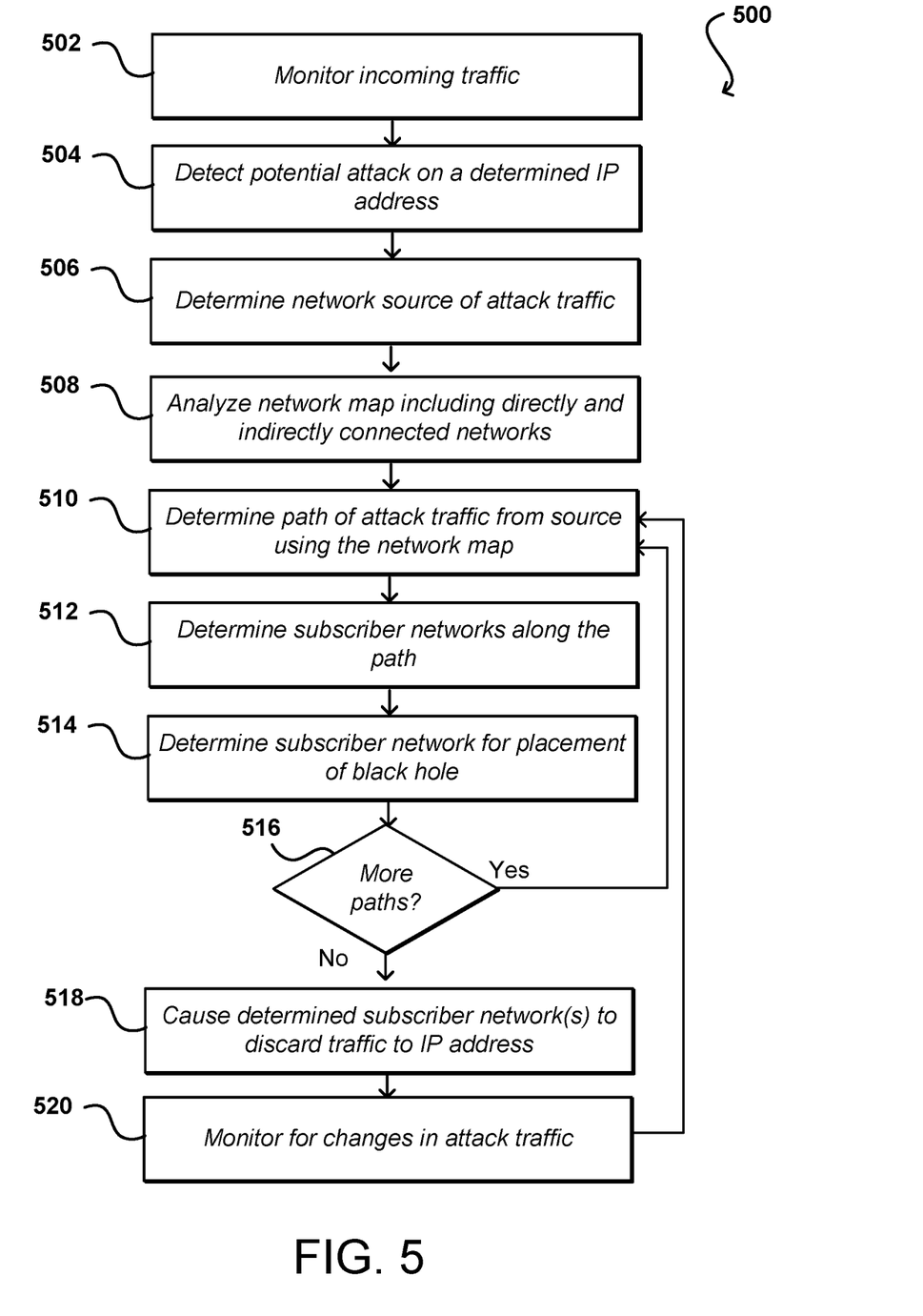
FIG. 5 illustrates an example process for placing precise black holes for attack mitigation that can be utilized in accordance with various embodiments.

FIG. 5 illustrates an example process 500 for mitigating a volumetric attack that can be utilized in accordance with various embodiments. It should be understood that for this and other processes discussed herein that additional, fewer, or alternative steps can be performed in similar or alternative steps, or in parallel, within the scope of the various embodiments unless otherwise stated. In this example, incoming traffic is monitored 502 for a plurality of different potential destinations, such as IP addresses associated with a resource provider environment. The traffic can be monitored to detect changes in the volumes or type of traffic received, among other such options. During the monitoring, a potential attack on an IP address can be determined 504, such as by detecting a volume of traffic exceeding an allowable threshold, expected range, or other such value. Other criteria can be used to determine whether the traffic corresponds to an attack, such as whether the traffic is from primarily a single source, whether the traffic corresponds to a legitimate purpose or task, whether the traffic is associated with a single account, etc.

Based on information associated with the traffic, such as BGP information discussed elsewhere herein, a network source of the attack traffic can be determined 506. This can be determined in at least some embodiments by looking at the routing information for the traffic and tracing the path back from the destination to the furthest network or entity determinable along the path. The network source may not be the actual source, which can correspond to a compromised client device or botnet, for example, but can be a network that corresponds to the attack traffic and is furthest from the resource provider environment, among other such options. A network map can then be analyzed 508 that includes networks that are both directly and indirectly connected to the resource provider environment. Based at least in part upon the map, a path of the attack traffic from the source network to the determined IP address can be determined 510. The path can include one or more determined networks that may subscribe to a traffic management service as discussed herein. The path can be analyzed to determine 512 one or more subscriber networks along the path. A subscriber network along the path can be selected to implement a black hole for the attack traffic 514. The network can be determined based upon a number of factors discussed elsewhere herein, as may include distance from the resource provider environment, bandwidth levels, congestion determinations, network policies, and the like. A determination can be made 516 as to whether there are additional paths along which the attack traffic is being received. If so, the process can continue to select another subscriber network along that path as well. If there are no other paths, or if it is determined that the path(s) already addressed are sufficient for the current attack determination, the determined subscriber network(s) can be caused 518 to discard traffic to the determined IP address corresponding to the attack. The attack traffic received can be monitored 520 for changes that might warrant additional or alternative mitigations across the networks. As mentioned, in some embodiments the black holes might have an expiration time or period, and upon expiration a decision might be made to reinstate the black hole or create a different black hole if the attack is still ongoing.

Figure 6:
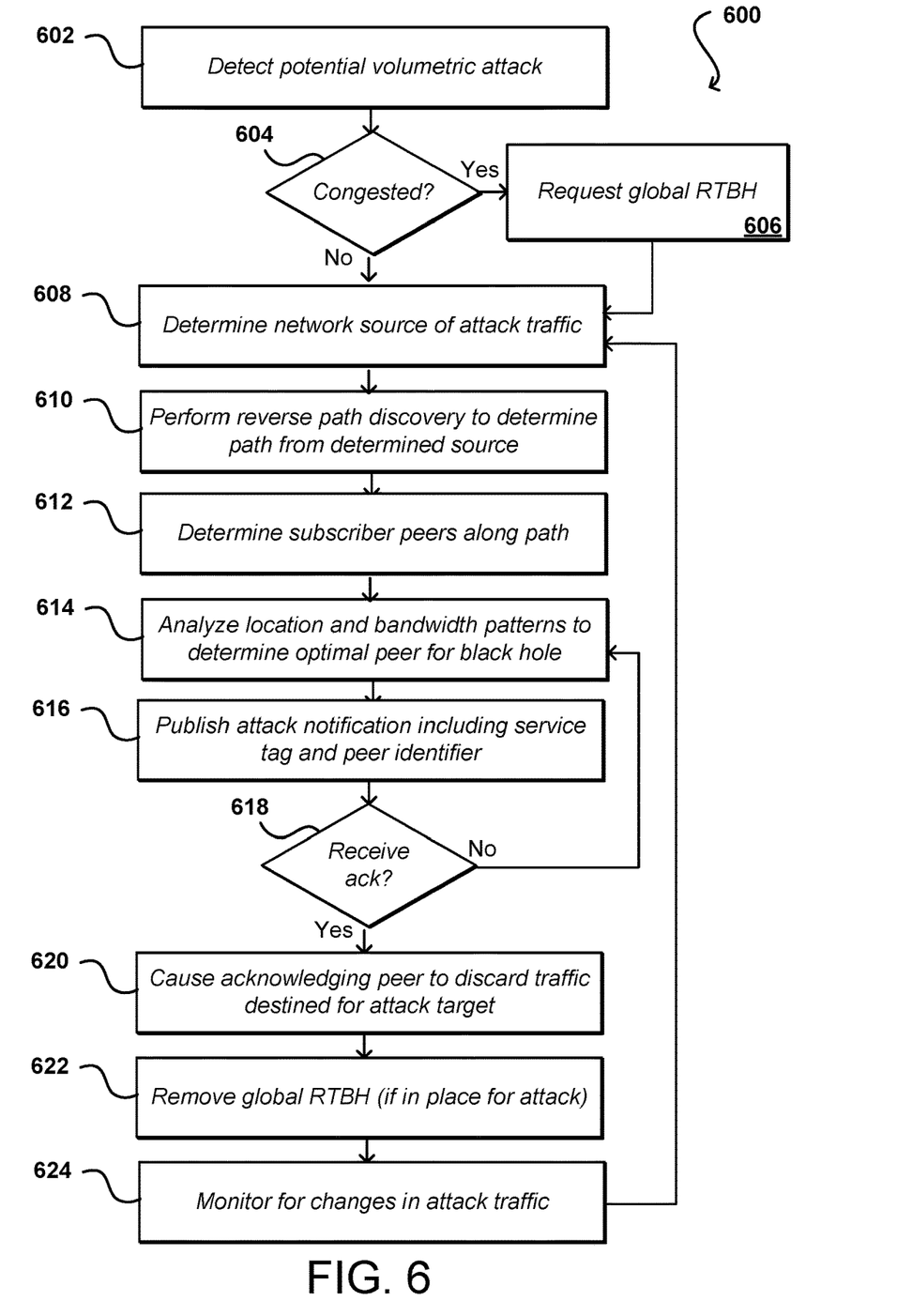
FIG. 6 illustrates an example process for implementing a precise black hole that can be utilized in accordance with various embodiments.

FIG. 6 illustrates another example process 600 for implementing a precise remotely triggered black hole that can be utilized in accordance with various embodiments. In this example, a traffic monitor, or other such system or service, can determine 602 that a potential volumetric attack is underway based upon factors such as the amount of traffic received at (or for) a particular destination, such as an IP address, as well as the type(s) of traffic received to that address. Systems or components associated with the attack destination can be analyzed to determine 604 whether the attack is of a type where the network as a whole is congested or being overwhelmed. If so, a conventional or global RTBH can be requested 606 to cause all traffic to that IP address to be dropped by one of the service providers. This would be for a situation where the attack is causing such an amount of damage or unavailability, or otherwise impacting service, that it is important to quickly block the attack traffic regardless of the impact on legitimate traffic. This might be acceptable, for example, when the system is being impacted such that legitimate traffic is being impacted either way. Even where a global RTBH is implemented, however, an attempt can be made to determine appropriate locations for one or more precise or specific black holes, which can then enable the global RTBH to be lifted. Further, if the attack is determined to not reach a level of impact on the available services to perform a full RTBH, then an attempt can be made to place one or more precise remote triggered black holes at the appropriate network locations. In this example, information for the attack can be analyzed to attempt to determine 608 a source network for the attack. As mentioned, this can be the network furthest from the resource provider network for which information is available and which is associated with the attack traffic.

Once the source is determined, a reverse path discovery process can be performed 610 using the routing information as discussed elsewhere herein to attempt to determine (per BGP or otherwise) the path which the traffic would take from the source, as network asymmetry allows for different paths in different directions. Once the path to the IP address from the source is determined, the networks acting as subscriber peers along the path can be determined 612. Information such as the distance from the resource provider environment (in terms of network hops) and bandwidth patterns can be analyzed 614 to determine which of these peers should implement a black hole. As mentioned, this can include one or more networks as may be determined based upon probability or other such information. The appropriate IP address, ASN, and tag information can be determined for the selected peers, and this attack information published 616 such that the peers can receive the information and determine whether they have been identified for a black hole for the identified traffic. In some embodiments BGP can leverage MD5 authentication to provide end to end tamper proof security for the transmission, and in some cases Generic Routing Encapsulation/Internet Protocol Security (GRE/IPSec) can be utilized to encrypt the transmission as well. If receiving the attack information and able to implement the black hole, an acknowledgement can be received 618 from the selected peer. The peer can then implement the black hole and be caused 620 to discard traffic for the IP address targeted for the attack. If so, the peer(s) can send an acknowledgement and begin discarding the traffic until such time as the black hole is to be removed. The acknowledgement enables the subscriber network as a whole to determine that a black hole is in place, as well as the location of that black hole. If a global RTBH was triggered, then the global RTBH can be removed 622 once the precisely or specifically placed black holes are in place. The effect can be monitored 624 over time and, if an unacceptable amount of attack traffic is still being received, additional or alternative black holes can be implemented. Similarly, if an acknowledgement is not received or an identified network indicates it will not implement a black hole then alternative black holes may be determined. The process can continue until the attack is sufficiently mitigated. The traffic can also be monitored such that the black holes can be removed once the attack is no longer ongoing, in order to allow legitimate traffic to once again be directed to the target IP address. In other embodiments the black holes can be set to expire after a determined period of time, or at a specified time, and can be reinstated if the attack traffic is still being received. The period of time can increase with each reinstatement.

In some embodiments subscribers can also be permitted to utilize an analysis engine of the BAAS service for improved network path visibility. Subscribers can be allowed to export netflows, for example, to a BAAS flow collection service. BGP route information provided by subscribers can also be utilized to create a more complete picture of the global routing table. This can be accomplished by BGP route exchange, or an API call to a BAAS client that would then inquire and obtain route information for the questioned network.

Figure 7:
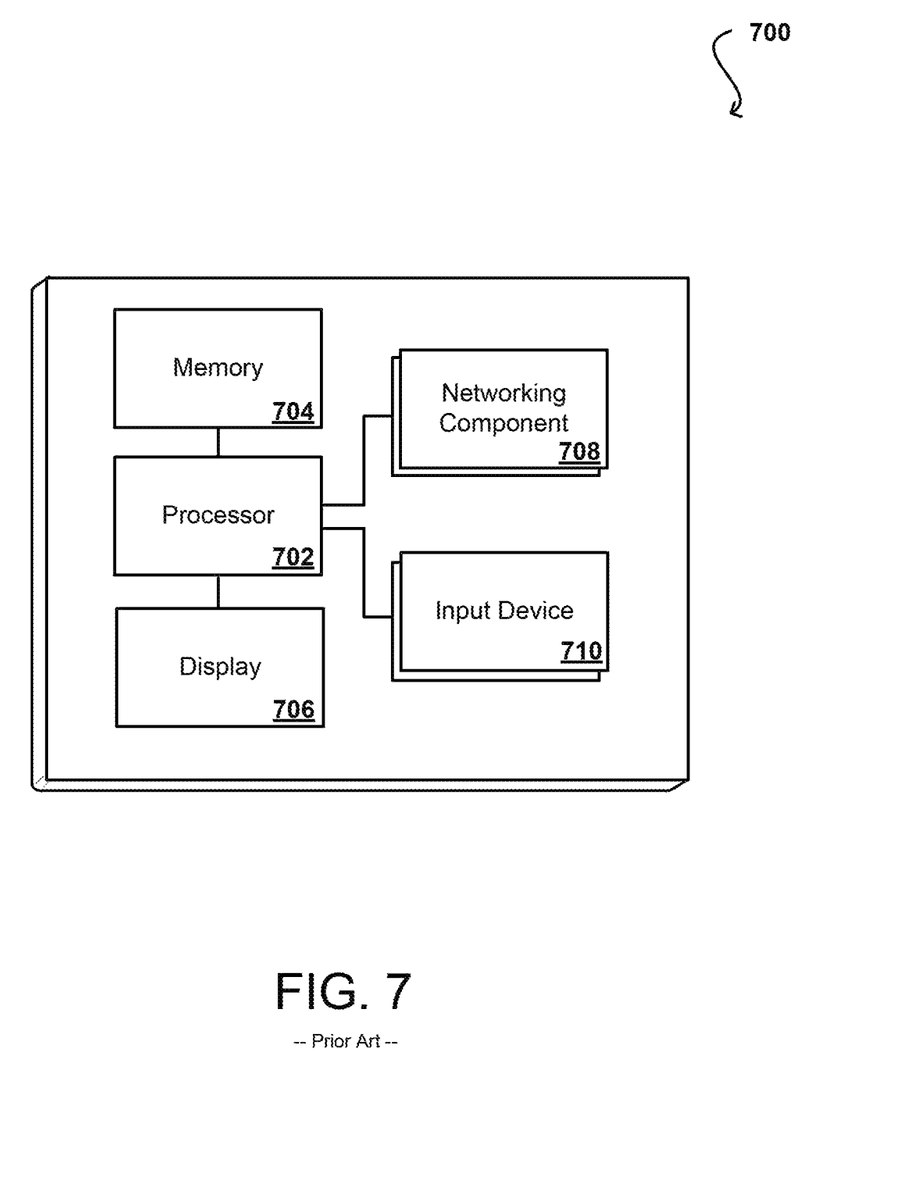
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or a computer-readable medium (or multiple media), such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth™ or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), and Common Internet File System (CIFS). The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response to requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   detecting a potential congestion event on a targeted network destination;
   determining a network path of congestion event traffic associated with the potential congestion event;
   determining subscriber networks that subscribe to a network management service and that are associated with the network path; and
   sending information about the potential congestion event to a subscriber network provider corresponding to the network management service to enable implementation of a black hole at one of the determined subscriber networks using network infrastructure based in part on a logical distance of the targeted network destination from the one of the determined subscriber networks, the black hole to prevent network traffic that is destined for the targeted network destination from being routed to the targeted network destination.

2. The computer-implemented method of claim 1, further comprising:
   receiving an acknowledgement from the subscriber network provider that the subscriber network provider will prevent the network traffic from being routed to the targeted network destination for a determined length of time;
   analyzing, after the determined length of time, the network traffic destined for the targeted network destination; and
   sending a request to the subscriber network provider to prevent the network traffic from being routed to the network destination for an additional length of time.

3. The computer-implemented method of claim 1, further comprising:
   analyzing border gateway protocol (BGP) information for the network traffic to determine a network source of the congestion event traffic; and
   determining the network path by performing a reverse path discovery between the network source of the congestion event traffic and the targeted network destination.

4. The computer-implemented method of claim 1, further comprising:
   determining that a second potential congestion event on a second targeted network destination is causing more than a threshold amount of congestion on resources associated with the second targeted network destination; and requesting that a network provider having available network infrastructure directly connected to the resources associated with the second targeted network destination drop all network traffic destined for the second targeted network destination.

5. The computer-implemented method of claim 1, further comprising:
causing the subscriber network provider to prevent the network traffic from being routed to the targeted network destination by dropping packets of the network traffic at the black hole.

6. The computer-implemented method of claim 1, further comprising:
selecting an alternative network provider along the network path if an acknowledgement is not received from the subscriber network provider within a threshold length of time.

7. The computer-implemented method of claim 1, further comprising:
sending information about the potential congestion event to each provider that subscribes to the network management service, wherein at least one network provider is enabled to determine whether to route the network traffic destined for the targeted network destination.

8. The computer-implemented method of claim 1, wherein the determined subscriber networks are determined based upon at least one of a bandwidth state of the subscriber network provider, a projected impact on the potential congestion event, or a routing policy associated with the subscriber network provider.

9. The computer-implemented method of claim 1, wherein the information about the potential congestion event further includes an IP address associated with the network source of the congestion event traffic.

10. The computer-implemented method of claim 1, further comprising:
determining at least one additional path along which the congestion event traffic is being received; and
causing at least one additional subscriber network provider subscribing to the network management service and having available network infrastructure along the at least one additional path to drop the congestion event traffic.

11. The computer-implemented method of claim 1, further comprising:
enabling at least one of a plurality of subscriber network providers to provide network traffic data through an application programming interface (API) associated with the network management service.

12. A system, comprising:
at least one processor; and
memory including instructions that, when executed by the at least one processor, cause the system to:
detect a potential congestion event on a targeted network destination;
determine a network path of congestion event traffic associated with the potential congestion event;
determine subscriber networks that subscribe to a network management service and that are associated with the network path; and
send information about the potential congestion event to a subscriber network provider corresponding to the network management service to enable implementation of a black hole at one of the determined subscriber networks using network infrastructure based in part on a logical distance of the targeted network destination from the one of the determined subscriber networks, the black hole to prevent network traffic that is destined for the targeted network destination from being routed to the targeted network destination.

13. The system of claim 12, wherein the instructions, when executed, further cause the system to:
cause the subscriber network provider to prevent the network traffic from being routed to the targeted network destination by dropping packets of the network traffic at the black hole.

14. The system of claim 12, wherein the instructions, when executed, further cause the system to:
select an alternative network provider along the network path if an acknowledgement is not received from the subscriber network provider within a threshold length of time.

15. The system of claim 12, wherein the determined subscriber networks are determined based upon at least one of a bandwidth state of the subscriber network provider, a projected impact on the potential congestion event, or a routing policy associated with the subscriber network provider.

16. A non-transitory computer-readable storage medium including instructions that, when executed by at least one processor of a computing device, cause the computing device to:
detect a potential congestion event on a targeted network destination;
determine subscriber networks that subscribe to a network management service and that are associated with the network path; and
send information about the potential congestion event to a subscriber network provider corresponding to the network management service to enable implementation of a black hole at one of the determined subscriber networks using network infrastructure based in part on a logical distance of the targeted network destination from the one of the determined subscriber networks, the black hole to prevent network traffic that is destined for the targeted network destination from being routed to the targeted network destination.

17. The non-transitory computer-readable storage medium of claim 16, wherein the instructions, when executed, further cause the computing device to:
cause the subscriber network provider to prevent the network traffic from being routed to the targeted network destination by dropping packets of the network traffic at the black hole.

18. The non-transitory computer-readable storage medium of claim 16, wherein the instructions, when executed, further cause the computing device to:
select an alternative network provider along the network path if an acknowledgement is not received from the subscriber network provider within a threshold length of time.

19. The non-transitory computer-readable storage medium of claim 16, wherein the determined subscriber networks are determined based upon at least one of a bandwidth state of the subscriber network provider, a projected impact on the potential congestion event, or a routing policy associated with the subscriber network provider.

20. The non-transitory computer-readable storage medium of claim 16, wherein the instructions, when executed, further cause the computing device to:
determine at least one additional path along which the congestion event traffic is being received; and cause at least one additional subscriber network provider subscribing to the network management service and having available network infrastructure along the at least one additional path to drop the congestion event traffic.

* * * * *